United States Patent [19]
Getman et al.

[11] Patent Number: 6,049,021
[45] Date of Patent: Apr. 11, 2000

[54] METHOD FOR REMEDIATING SITES CONTAMINATED WITH TOXIC WASTE

[75] Inventors: Gerry D. Getman, Marengo; Jon E. Rogers, Mt. Gilead; Wood E. Hunter, Marengo, all of Ohio

[73] Assignee: Commodore Applied Technologies, Inc., New York, N.Y.

[21] Appl. No.: 09/248,879

[22] Filed: Feb. 11, 1999

[51] Int. Cl.⁷ .............................. G21F 9/00; A62D 3/00; B01D 11/00; C02F 1/70; B01J 8/00

[52] U.S. Cl. .................. 588/1; 588/200; 588/202; 588/203; 588/205; 588/206; 588/207; 588/215; 588/231; 588/236; 588/238; 588/18; 423/23; 423/24; 423/27; 423/32; 423/33; 134/2; 134/10; 134/34; 134/36; 210/749; 210/757; 405/263

[58] Field of Search ..................... 588/200, 202, 588/203, 205, 18, 1, 206, 207, 215, 231, 236, 238; 134/2, 10, 34, 36; 423/23, 24, 27, 32, 33; 210/749, 757; 405/263; 208/179, 181, 182, 262.1, 262.5; 585/833, 860, 861

[56] References Cited

U.S. PATENT DOCUMENTS

| | | | |
|---|---|---|---|
| 4,853,040 | 8/1989 | Mazur et al. | 134/2 |
| 5,110,364 | 5/1992 | Mazur et al. | 134/2 |
| 5,495,062 | 2/1996 | Abel | 588/1 |
| 5,516,968 | 5/1996 | Abel | 588/1 |
| 5,613,238 | 3/1997 | Mouk et al. | 588/1 |

FOREIGN PATENT DOCUMENTS

| | | | |
|---|---|---|---|
| WO 97/18858 | 5/1997 | WIPO | A62D 3/00 |
| WO 98/28045 | 7/1998 | WIPO | A62D 3/00 |

*Primary Examiner*—Steven P. Griffin
*Assistant Examiner*—Eileen E. Nave
*Attorney, Agent, or Firm*—Howard M. Ellis; Marianne Fuierer

[57] ABSTRACT

Methods for decontaminating toxic waste, particularly solid carrier materials, such as soil contaminated with a toxin, or solid mixed wastes are more efficiently decontaminated with solvated electrons by first extracting the toxin from the carrier with a nitrogenous base at elevated temperatures, followed by a temperature reduction before initiating chemical reduction of the toxin with solvated electrons. Pre-extraction of the toxin at elevated temperatures followed by temperature reduction minimizes competing side reactions, improves selectivity of solvated electrons for the toxin and improves the economics of the process with more efficient metal utilization. The process can be performed without separation of the toxin from the extraction vessel holding the solid carrier material. Alternatively, elevated temperatures can be used to perform one or more extractions of toxin with nitrogenous base followed by reduction with solvated electrons by performing the reaction in a separate reactor. The processes of the invention are useful in the destruction of virtually any chemically reducible hazardous substance.

27 Claims, No Drawings

METHOD FOR REMEDIATING SITES CONTAMINATED WITH TOXIC WASTE

TECHNICAL FIELD

This invention is in the field of chemical processes, especially processes for separating hazardous toxins from contaminated substrates. More specifically, nitrogenous base, optionally containing solvated electrons, is employed to decontaminate toxic waste and remediate toxic waste sites.

BACKGROUND OF THE INVENTION

As a result of various industrial activities over the last 50 years or so by or on behalf of federal governments and also by private industry for its own purposes, numerous toxic waste sites have been identified, both in the United States and abroad. As the world's citizenry has become more knowledgeable about environmental matters, remediation of toxic waste sites has become a top priority for government. It is one objective of remediation to remove the toxins from on-site substrates, thereby rendering the substrates safely reusable. It is another objective to produce a reduced volume of concentrated and often still hazardous toxin for further treatment or final disposition. In favorable cases the process employed to remove the toxin also reduces or eliminates its toxicity. In general, the remediation of a toxic waste site presents significant technical challenges.

The nature of the toxic waste to be treated varies with the site. In some cases the toxin falls into a single category, such as heavy metals. Each category of toxin can require a process tailored to that category, and species-specific processes within a single category are necessary in some cases. Quite often the toxin consists of a mixture of chemical entities from different toxin categories. It can be especially difficult to separate such mixed toxins from the substrates upon which or in which the toxins are found.

In addition to the difficulties presented by the fact that different categories of toxins present different processing problems, there also are many different substrate types, so each toxic waste can present unique handling demands. For example, the decontamination of a soil, earth or dirt substrate contaminated with a toxin presents much different handling and processing requirements than the decontamination of workers' clothing contaminated with the same toxin.

A series of U.S. Patents held by the assignee of the instant application disclose and claim methods for removing toxins representative of many different categories from various substrates. Several of these patents are cited in the following paragraphs, their full texts being incorporated herein by reference. A common feature of these methods is that they employ similar chemistry, viz., "nitrogenous base/solvated electron" chemistry, the meaning of which is set forth in the prior art and in summary form hereinafter.

The term "nitrogenous base" is synonymous with the terms "ammoniacal liquid" and "a liquid ammonia" in the prior art and includes anhydrous liquid ammonia, amines, etc. Solvated electrons can be generated in the nitrogenous base electrolytically or by the addition of an active metal, such as sodium.

Several of the assignee's patents involve contaminated soil as the toxic waste. As a substrate or carrier type, "soil" is taken to have its ordinary meaning; soil includes one or more components in widely varying amounts, such as, clay, sand, stone, rock particles, organic matter, silt, water, etc.

Radioactive nuclides constitute one toxin category, and nuclear waste in which the toxin comprises at least one radioactive nuclide constitutes one type of toxic waste. The term "radioactive nuclide" includes the radioactive isotopes of elements comprising the Periodic Table of the Elements, radioactive compounds containing those elements, as well as both radioactive and non-radioactive products of their nuclear fission. Elements exhibiting radioactive isotopes include, for example, carbon, cesium, cobalt, potassium, plutonium, uranium, ruthenium, tellurium, thorium, strontium, rubidium, yttrium, rhenium, rhodium, palladium, technetium, neptunium, and americium. Nuclear waste comprising radioactive nuclides mixed with absorbed, or adsorbed in soil has been produced as a result of military testing programs involving the detonation of nuclear devices in the western deserts of the United States and elsewhere, leading to vast areas of real estate carrying hazardous nuclear waste.

U.S. Pat. No. 5,495,062 discloses and claims a process for separating radioactive nuclides from soil. The process involves slurrying the contaminated soil with ammonia, optionally containing solvated electrons. After the slurry settles, the more dense soil particles collect as a predominantly solid phase at the bottom of the slurry, while the less dense soil fines and nuclear waste are concentrated in the predominantly fluid upper phase. The decontaminated soil is readily recovered. Although solvated electrons need not be present, their presence improves layer demarcation in the slurry.

Heavy metals constitute another toxin category. "Heavy metals" are generally regarded as those metals which have a density of at least about 5.0 $g/cm^3$. The "heavy metals" category includes, e.g., non-radioactive isotopes of mercury, arsenic, selenium, cadmium, chromium, and lead. Heavy metals are particularly difficult to eradicate from soil because they form water-soluble salts which are carried by sewage streams, rain water, etc., to locations distant from the original sites of their introduction into the environment.

Pursuant to the teachings of U.S. Pat. No. 5,516,968, elemental mercury can be separated from soil by slurrying the soil with an ammoniacal liquid and allowing the slurry to settle, whereupon the very dense mercury coalesces beneath a layer of the densest soil particles, and the soil fines suspended in the ammoniacal liquid form an upper phase. The decontaminated soil can be recovered after draining off the mercury bottoms product and decanting off the upper liquid layer.

Mercury ions, as well as other heavy metal ions, can be cleaned from contaminated soils by methods disclosed in U.S. Pat. No. 5,613,238. The contaminated soil is slurried with an ammoniacal liquid. Upon settling, the slurry is separated into a lower phase containing relatively dense soil particles and an upper liquid phase containing soil fines and the heavy metal ions. Decontaminated soil is readily recovered from the lower phase. It has been speculated that the ammoniacal liquid facilitates dissolution of the heavy metal ions in the upper liquid phase by forming amine coordination complexes with the metal ions.

The methods of the aforecited patents are extended to the decontamination of soils containing mixtures of toxins from different categories. For example, if the toxic waste consists of soil contaminated with both elemental mercury and one or more radioactive nuclides, slurrying the contaminated soil with an ammoniacal liquid, followed by phase separation, results in the liquid mercury being obtained as a bottom product, while the nuclear waste is found in the upper liquid layer with the soil fines; a middle layer comprises the decontaminated soil particles and is readily recovered.

Halogenated organic compounds represent another toxin category. "Halogenated organics" include compounds containing both carbon and halogen. The category encompasses a number of pesticides and herbicides, polychlorinated biphenyls (PCBs) employed as dielectrics in electrical transformers, dioxins, as well as cleaning fluids, such as trichloroethylene, etc. Pursuant to the teachings of U.S. Pat. Nos. 4,853,040 and 5,110,364, substrates contaminated with one or more halogenated organics can be decontaminated by treating such toxic wastes with an ammoniacal liquid containing solvated electrons.

Other categories of toxins include polynuclear aromatic hydrocarbons, volatile organic compounds (VOC's), and sludges. The "polynuclear aromatic hydrocarbons" category includes, for example, naphthalene, anthracene, phenanthrene, naphthacene, pyrene, perylene, etc., all of which are solids at room temperature, and some of which are believed to be carcinogenic. "VOC's" include the common organic solvents, such as benzene, toluene, hexane, heptane, acetone, methylethyl ketone, diethyl ether, methyl cellusolve, etc., which generally are flammable liquids having relatively high vapor pressures at room temperature. There are several types of "sludge," a generic term including, for example, sewage sludge as well as the intractable tarry bottoms products produced by various industrial processes, including the extraction of sugar from sugar beets, papermaking, oil refining, etc. The nitrogenous base/solvated electron technology can be applied in the remediation of toxic waste sites containing toxins from all of these categories.

Application of the nitrogenous base/solvated electron technology does not require elaborate facilities. Even though solvated electrons in nitrogenous base comprise one of the most powerful reducing agents ever produced, it is possible to use this reagent against toxic waste in the field even though the ubiquitous oxygen, water, etc. would be expected to overwhelm the toxins in competition for the available solvated electrons.

Although the cited prior art demonstrates that nitrogenous base/solvated electron technology is extremely effective in treating a broad range of toxins, it has been observed that solvated electrons can also react with solid carrier materials, such as soils and sludges holding the toxins, e.g., PCBs, resulting in inefficiencies in the reduction process. For example, the presence of organic matter, iron, clay, water, high cation exchange capacity, pH, carrier matrix itself, and so on, can render attempts to destroy toxins with solvated electrons economically unattractive. Competing side reactions occurring simultaneously with the desired reduction reaction with the targeted toxin can result in excessively high alkali metal requirements, making economical remediation of soils, for example, with solvated electrons impractical. Furthermore, the introduction of additional amounts of alkali metal or other active metal exceeding the stoichiometric requirements does not necessarily off-set the above inefficiencies, nor does it assure the reduction of toxins to minimum levels permitted under government regulations. Use of excess sodium can also result in poisoning the substrate/carrier matrix material.

Accordingly, there is a need for more efficient and cost effective protocols in the application of solvated electron technology in the decontamination of toxic waste and remediation of toxic waste sites.

SUMMARY OF THE INVENTION

The activity which has led to contamination of the earth around and about industrial facilities has also led to the production of toxic waste within the factories, plants, warehouses, sheds, barns and similar structures wherein workers have assembled the devices, carried out the manufacturing, and conducted the toxin-generating processes. The toxic wastes created within factories and similar facilities do not always clearly announce their presence and are sometimes subtly concealed.

For example, a common treatment for toxic liquid spills in a factory is to absorb or adsorb the liquid in or on an innocuous solid carrier material, thus converting the liquid toxin into a solid toxic waste. Trash collectors and waste haulers prefer solid waste because solid waste is more likely to be acceptable for land filling. Liquid waste can be more difficult to dispose of, since liquid waste may leak out of a landfill, contaminate streams, etc. In addition, generally it is more complicated and expensive for a manufacturer to dispose of waste representing several states of matter, since the manufacturer may have to deal with more than one waste disposal company. There is an incentive to generate waste representing only one state of matter, preferably a solid.

It is not uncommon in a manufacturing facility to combine by-products generated in the operation with the general trash and sweepings. For example, in a facility which uses photoresist and etching technology to produce electronic parts such as semiconductor chips, it is not unusual to find toxic heavy metal compounds, like cadmium sulfide and gallium arsenide, as well as elemental heavy metals, in the general trash. The result of combining the various trash sources in a plant or factory is to produce a mixed solid waste containing a number of different toxins.

Cellulosic materials in particulate or fibrous form are often employed to absorb or adsorb liquid toxins and disperse solid toxins. A "cellulosic" material is a naturally occurring or man-made synthetic substance or mixture containing at least about 10 percent by weight of a compound having a polysaccharide molecular structure similar or identical to that of cellulose. Exemplary cellulosic materials in particulate form include sawdust, wood chips, comminuted, e.g., shredded or ground corn cobs, and kitty litter. Cellulosic materials in fibrous form include cotton, for example. Such cellulosic materials are often employed as carriers or substrates for various toxins.

Consequently, it is one objective of this invention to provide a method for decontaminating a toxic waste comprising at least one cellulosic substrate, for example, as a solid carrier material selected from the group consisting of particles and fibers, the method comprising treating the toxic waste with nitrogenous base, optionally, but preferably including solvated electrons.

The nitrogenous base/solvated electron technology has been applied in the prior art to decontaminate a number of toxic waste substrates contaminated with metals, such as radionuclides, heavy metals, hazardous organics, mixed wastes, and so on. It has now been found that such toxins can be more efficiently removed from the substrates they contaminate by adopting a process improvement of this invention.

Consequently, it is a further object of this invention to provide a method for decontaminating a toxic waste comprising the steps of:

(i) introducing a nitrogenous base, such as liquid ammonia and a toxic waste into a vessel, the toxic waste comprising a solid carrier material contaminated with a toxin;

(ii) extracting the toxin from the solid carrier material by agitating the nitrogenous base and toxic waste at an elevated temperature ranging from about 10° to about 60° C. to form an extracted mixture;

(iii) reducing the temperature of the extracted mixture sufficiently below the elevated temperature operated at in step (ii) to minimize the occurrence of competing side reactions during destruction of the toxin;

(iv) creating a reaction mixture by introducing into the extracted mixture of step (iii) an active metal suitable for dissolving in the nitrogenous base, and (v) reacting the reaction mixture.

It should be understood that step (iv) may be practiced by introducing a preformed solution of solvated electrons, although the in-situ generation of solvated electrons is preferred.

These inventors found that treating toxic waste initially with solvated electrons resulted in undesirable competing side reactions occurring between the electrons in solution and the carrier matrix, or certain components in the matrix, instead of selectively reacting with the toxin. This resulted in less efficient use of electrons and the consumption of higher stoichiometric equivalents of metal than would otherwise be required in dissolving metal reactions. However, it was also discovered the selectivity of the solvated electrons for the toxin per se could be enhanced for more efficient use of metal if the toxic waste comprising the solid carrier material was first pretreated with a nitrogenous base, such as liquid ammonia alone, and at elevated temperatures. This was found to enhance the release of the toxin from the solid carrier material. By then reducing the temperature of the extracted mixture and preferably introducing the active metal for generation of solvated electrons in-situ undesirable competing side reactions occurring between the solvated electrons and solid carrier or other matter, e.g., organic matter, iron, moisture, clay, the carrier matrix, etc., are minimized, and selectivity for the toxin improved. Accordingly, the dissolving metal, e.g., sodium, is used more efficiently, and the overall economics of the process are improved.

Advantageously, this embodiment of the invention with its temperature differential enables performing the entire process in the same vessel without physically separating the extractant and toxin from the carrier material for detoxifying in a separate vessel. Surprisingly, it was discovered that the elevated extraction temperatures of step (ii) above followed by the lower operating temperatures of step (iii) allow for preferential destruction of the toxin in the presence of the solid carrier, for example, which can otherwise compete with and consume ammoniated electrons resulting in less efficient use of the active metal.

Alternatively, it is still a further object of the invention to provide a process for decontaminating a toxic waste where inefficient competing reactions are avoided by physically separating the toxin from the carrier for treatment with solvated electrons. The toxin is substantially fully extracted by washing from the solid carrier/substrate material, transferred to a vessel away from substrate and chemically treated with solvated electrons. The reduction reaction is performed in the absence of the carrier and other competing substances thereby minimizing competing side reactions. This embodiment comprises the steps of:

(i) introducing a nitrogenous base, such as liquid ammonia and a toxic waste into a vessel to form a mixture, the toxic waste comprising a solid carrier material contaminated with a toxin;

(ii) washing the mixture by agitating the nitrogenous base and toxic waste at an elevated temperature ranging from about 10° to about 60° C. to remove the toxin from the solid carrier material and to form a nitrogenous extract therewith;

(iii) separating the nitrogenous extract comprising the toxin from the solid carrier material;

(iv) repeating the washing and separating steps (ii and iii) a sufficient number of times to reduce the level of toxin in the solid carrier material to about <10 ppm by mixing additional nitrogenous base and the solid carrier material of step (iii) to form further nitrogenous extract(s);

(v) creating a reaction mixture by introducing into the nitrogenous extracts of steps (iii and iv) an active metal suitable for dissolving in the nitrogenous extract(s), and (vi) reacting the reaction mixture.

Once again, the foregoing alternative method contemplates the introduction of preformed solvated electrons in step (v), although in-situ generation of solvated electrons is preferred.

This alternative method provides for extracting toxin from the solid carrier material through one or more washings. Because the toxin is separated from the carrier material the risk of competing reactions occurring is significantly reduced and less efficient use of active metal avoided.

The invention also contemplates as an application of the nitrogenous base/solvated electron technology, the improvement of pretreating the toxic waste with aqueous acid prior to subjecting the waste to the nitrogenous base/solvated electron technology.

Such pretreatment increases the amount of contaminating metal ultimately transferred from the toxic waste to the nitrogenous base phase, thereby increasing the efficiency of the process. While neither intending or desiring to be bound by this explanation, it is believed tentatively that, to the extent metals are initially present as their oxides or sulfates, the probable effect of the pretreatment is to convert such salts to others which are more soluble in the nitrogenous base phase than the oxides or sulfates. To the extent the toxic metals are initially present in the form of elemental metals, the probable effect of the pretreatment is believed to be the creation of salts which are then soluble in the nitrogenous base layer.

Furthermore, it has been found that toxic wastes first treated according to the nitrogenous base/solvated electron technology are profitably post treated with strong base to increase the amount of the toxicant which appears in the nitrogenous base phase, increasing the efficiency of the process. Consequently, it is still another objective of this invention to provide, in a process for decontaminating a toxic waste by application of the nitrogenous base/solvated electron technology the step of treating the toxic waste with strong base after application of the nitrogenous base/solvated electron technology.

Additional objectives of this invention will become event upon reference to the following detailed description of the invention.

DETAILED DESCRIPTION

The methods of this invention can be applied to decontaminate toxic waste in which the contaminated substrates or solid carriers and toxins are selected from a broad range of materials. Solvated electrons are powerful reducing agents, and the improved methods of this invention enable optimizing efficiencies and economics making them even more attractive for use in remediating sites contaminated with large volumes of toxic wastes.

Generally, the substrate or solid carrier material is virtually any material, and especially those which are capable of performing as an adsorbent or absorbent for a toxin. Representative examples of solid carrier materials which may be treated according to the methods described herein include, but are not limited to soil, sand, gravel, clay, stone, concrete, asphalt, brick, block, masonry, carbon, e.g., activated carbon, carbon black; zeolites, polymers, plastics, elastomeric materials, e.g., natural and synthetic type rubbers; metals and metal alloys like steel; glass, glass fibers, textiles including clothing; cellulosic materials, and combinations thereof, to name but a few.

The methods are especially useful in decontaminating solid carriers like cellulosic materials, including wood, wood chips, sawdust, paper, paper board, corn cobs typically shredded or ground, cotton fibers and mixtures thereof.

Toxins which can be successfully treated with solvated electrons comprises a broad range of hazardous materials, and includes virtually any chemically reducible substance. A few representative classes of chemically reducible substances include energetic materials, radionuclides, nuclear waste, heavy metals, organics and particularly halogenated organics, polynuclear aromatic hydrocarbons, volatile organic compounds (VOC's), sludges, and mixed wastes thereof. "Energetic material" is an art recognized expression. See, for example, PCT International Application WO 98/28045, published Jul. 2, 1998, entitled "Method for Destroying Energetic Materials", the contents of which is incorporated-by-reference herein. Also see, the Department of the Army Technical Manual TM 9-1300-214, "military Explosives", Headquarters, Dept. of the Army, 1984 and the manual provided at "An Introduction to Explosives", presented at the FAA's Energetic Materials Workshop, Avalon, N.J., Apr. 14–17, 1992, the contents of both are incorporated-by-reference herein. Solvated electrons are useful in detoxifying mixed wastes of the above classes of chemically reducible materials, like ions of hazardous non-radioactive metals or metalloids along with polyhalogenated organic compounds, like polychlorinated biphenyls (PCBs), as well as dioxins, e.g., 2,3,7,8-tetrachloro-dibenzo-p-dioxin, and any of the several other members of the family of chlorinated dioxins, and various pesticides. The term—pesticide—denotes any substance, organic or inorganic, used to destroy or inhibit the action of plant or animal pests. This would include insecticides, herbicides, rodenticides, miticides, and so on.

Whereas there are several variations in the methods of this invention, depending upon the specific substrates/solid carrier materials and toxins involved, the more efficient and economic processes disclosed herein involving the use nitrogenous base/ammoniacal liquid solvated electron technology are preferably employed. Some of the generally known background information relating to the use of solvated electron technology can be found in the patents mentioned above which have been incorporated herein by reference. Consistent with the teachings of those patents, nitrogenous base alone in some, but not all instances is effective in decontaminating certain specific toxic wastes. The presence of solvated electrons are required when the toxin includes chemically-reducible material. In other instances, the presence of solvated electrons is often desirable, however, because their presence appear to sharpen the lines of demarcation between the phases which must be separated in order to recover the decontaminated substrate.

With the inclusion of solvated electrons an active metal is dissolved in the nitrogenous base selected from one or a combination of metals found in Groups IA and IIA of the Periodic Table of the Elements. They are the alkali and alkaline earth metals. Largely for reasons of availability and economy, it is most preferred that the active metal be selected from the group consisting of Li, Na, K, Ca, and mixtures thereof. In most cases, the use of sodium, which is widely available and inexpensive, will prove to be satisfactory.

The nitrogenous base is required and can be selected from ammonia, amines, and the like, or mixtures thereof. Anhydrous liquid ammonia is readily available, since it is widely employed as a fertilizer in agricultural operations. Consequently, it is also relatively inexpensive, and so it is the preferred nitrogenous base. However, ammonia boils at about $-33°$ C., requiring in some cases that solutions of liquid ammonia be cooled, that the solutions be pressurized, or both. In those cases where this is inconvenient, a number of amines are readily available and can be employed as the nitrogenous base.

Representative classes of useful amines include primary amines, secondary amines, tertiary amines, and mixtures thereof. Specific examples of such amines include alkyl amines, like methylamine, ethylamine, n-propylamine, isopropylamine, 2-methylpropylamine, and t-butylamine, which are primary amines; as well as dimethylamine and methylethylamine, which are secondary amines; and tertiary amines, such as triethylamine. Di- and trialkylamines can also be employed, as can saturated cyclic amines, such as piperidine. Amines which are liquids at the desired reaction temperature are preferred and, among these amines, methylamine (bp $-6.3°$ C.), ethylamine (bp $16.6°$ C.), propylamine (bp $49°$ C.), isopropylamine (bp $33.0°$ C.), butylamine (bp $77.8°$ C.), and ethylenediamine (bp $116.5°$ C.), are especially useful.

In some cases it will be advantageous to combine the nitrogenous base with another solvating substance such as an ether;

for example, tetrahydrofuran, diethyl ether, dioxane, or 1,2-dimethoxyethane, or a hydrocarbon; for example, pentane, hexane, decane, and so forth. In selecting the nitrogenous base and any cosolvents to be included therewith, it should be borne in mind that solvated electrons are extremely reactive, so it is preferred that neither the nitrogenous base nor any cosolvent included therewith contain groups which compete with the toxic waste and react with the solvated electrons. Such groups include, for example, aromatic hydrocarbon groups which may undergo the Birch reduction, and acid, hydroxyl, peroxide, sulfide, halogen, and ethylenic unsaturation.

Although other conditions can sometimes be employed to advantage, the initial steps of extracting the toxin from the substrate carrier according to methods of this invention with nitrogenous base, and particularly, ammoniacal liquids are carried out at elevated temperatures ranging from about $10°$ to about $60°$ C., and more specifically, from about $20°$ to about $40°$ C. While it is possible to conduct extractions at higher temperatures than those previously stated, such higher temperatures also mean operating at higher pressures. Consequently, restrictions in higher operating temperature are often the result of equipment limitations. Hence, most effective extractions can be performed at temperatures generally ranging from as low as $10°$, although more preferably from temperatures starting from about $20°$ to about $50°$ C. Most preferably, extraction of the toxin from the solid carrier can be performed at elevated temperatures starting from about $30°$ up to above about $40°$ C. Generally, the extraction temperature should be from about $10°$ to about $70°$ higher than the subsequent chemical reaction temperature with solvated electrons. Such elevated temperatures when performed with agitation enhance the extraction efficiency.

In the alternative method of decontaminating a toxic waste as discussed above wherein a nitrogenous base, like anhydrous liquid ammonia is introduced into a first vessel to form a mixture with the toxic waste, one or more washings may also be performed by agitating the mixture at elevated temperatures. Those elevated temperatures correspond to the elevated temperatures discussed above. After separation and removal of the extracted toxin from the mixture further washing of the carrier material may be desirable to bring the level of residual toxin in the solid carrier down to about 10 ppm, or less. Repeated washing of the solid carrier with nitrogenous base, e.g., ammoniacal liquid, like liquid ammonia can be performed under similar operating conditions as described herein. After each washing the nitrogenous extract containing the toxin is separated from the solid carrier material in the first vessel. Separation of the washings/nitrogenous extract from the solid carrier material is performed by conventional means, such as filtration, precipitation, decantation, centrifugation, and so on. The washings containing the toxin can be combined into a separate vessel for further treatment, i.e., detoxification by introducing the active metal in the formation of solvated electrons in-situ, or by introducing a preformed solution of solvated electrons, although somewhat less preferred.

The invention can be performed with the optional preliminary step of reducing the particle size of the toxic waste material to increase the surface area and exposure to the nitrogenous base in washing the toxin(s) therefrom. For instance, contaminated soil can be milled into small particulates by conventional means, or by grinding or pulverizing contaminated cellulosic material, such as wood chips to sawdust for improving the overall efficiency in extracting toxin from the carrier. It was found that toxic wastes, such as weathered soils comprised mainly of rock, gravel and sand, and contaminated with PCBs are more amenable to PCB destruction if the soil has a high surface area. It is possible to achieve a much improved >99 percent reduction in PCBs of weather soils by milling to a −20 mesh.

Similarly, the removal of water/moisture from the toxic waste can also be performed by an optional preliminary step. While decontamination of substrates, according to the methods disclosed herein can be performed on substrates containing water, a preliminary step of drying the toxic waste provides for more efficient use of dissolving metal in the chemical reduction of toxins with solvated electrons. For example, passage of contaminated soil particulates on a conveyor through a drying oven to remove most or substantially all residual moisture is usually effective in enhancing the selectivity of the reduction reaction and overall economics of the decontamination process.

The selectivity of solvated electrons for the extracted toxin improves the decontamination process by minimizing unwanted competing side reactions with the carrier material and other substances for more efficient use of dissolving active metal by lowering the temperature of the extracted mixture to below the elevated temperatures employed in extracting/washing toxin from the solid carrier material. Stoichiometric or relatively small excess quantities of active metal are employed in view of fewer competing side reactions occurring at the reduced temperature ranges. In practice, the temperature of the mixture before addition of metal is generally lowered from about 10° to about 70° below the temperature employed in the extraction/washing steps. More specifically, by lowering the temperature of the mixture comprising the solid carrier, the extracted toxin and nitrogenous base from about 20° to about 50° below the operating temperature during extraction of the toxin from the toxic waste material competing side reactions with the carrier material, etc., are minimized. Thus, when the temperature is elevated to 40° C., for instance, for extracting the toxin from the solid carrier material, subsequently the temperature of the mixture would be lowered to between about 10° C. and about −20° C. before introducing the metal for dissolution and formation of solvated electrons to initiate chemical reduction of the toxin. Similarly, when extracting the toxin from the solid substrate at ambient temperature conditions of about 20° C. with liquid ammonia the temperature of the extracted mixture containing the solid carrier material, toxin and nitrogenous base is lowered to between about 10° C., and about −20° C.

Although the extraction and washing steps can be carried out at subatmospheric pressure, it is preferred that the process be performed in the pressure range of about 85 psig to about 365 psig. More preferably, the reaction is carried out under a pressure of about 125 to about 200 psig.

In carrying out the method of this invention, the ratio of nitrogenous base/toxic waste in the reaction mixture is preferably between about 1/1 to about 1,000/1 on a weight/weight basis, more preferably between about 1/1 and 15/1, and most preferably between about 2/1 and about 4/1.

The amount of active metal should preferably be in the range of about 0.1 percent to about 12 percent by weight based on the weight of the mixture; more preferably between about 2 percent and about 10 percent, and most preferably between about 3.5 percent and about 4.5 percent by weight.

On a metal weight/toxin weight basis, the reaction mixture may contain between about 2.0 and 240.0 times as much metal as toxin, more preferably between about 40 and about 200 times as much, and most preferably between about 70 and about 90 times as much metal as toxin in the toxic waste.

While the process of decontaminating toxic waste may be performed by introducing preformed solutions of solvated electrons in a nitrogenous base, such as liquid ammonia, to destroy the toxin, unexpectedly it was found that the addition of the active metal directly into the extracted toxin to form solvated electrons in-situ may also help minimize unwanted competing side reactions. That is, preformed solutions of solvated electrons introduced into the mixture containing the extracted toxin may result in competing side reactions and less efficient use of metal than when the electrons are prepared in-situ by introducing solid metal into the reaction zone.

The course of the reaction involving solvated electrons can be followed by monitoring the blue color or conductivity of the reaction mixture which is characteristic of solutions of nitrogenous base and active metal. When the blue color disappears, it is a signal that the toxic waste has reacted with all of the solvated electrons, and more active metal or solution containing solvated electrons can be added, if necessary. The rate of the reaction between the toxic waste and solvated electrons is rapid, the reaction in most cases being substantially complete in a matter of minutes to a few hours.

The method of this invention can be carried out batchwise in a sealed pressure vessel equipped with heating/cooling, stirring, etc. It is also possible to carry out the process on a continuous basis, such as by employing a decanter to continuously separate the phases, i.e., the nitrogenous base from the solid carrier material.

In the event the improvement in the nitrogenous base/solvated electron technology of this invention is practiced by pretreating the toxic waste with acid, the toxic waste is first slurried with aqueous acid. Although sulfuric acid and phosphoric acid can be employed, it is preferred that nitric acid be utilized, since nitrate salts are generally more soluble in nitrogenous base than are most other salts.

This pretreatment is preferably conducted at room temperature in a stirred open vessel, although the pretreatment can be conducted at any temperature in the range of about 0° to about 100° C. in more elaborate equipment. The aqueous acid may contain between about 5 percent by weight and about 50 percent by weight acid, but it is preferred that the aqueous acid contain between about 10 percent by weight and about 25 percent by weight acid. Although the ratio of toxic waste/aqueous acid can vary between about 1/10 to about 1/100 on a weight/weight basis, depending on the density of the toxic waste, it is preferred that about 1/25 toxic waste/aqueous acid be employed on a weight/weight basis.

Sufficient aqueous acid should be used to thoroughly wet the toxic waste and provide a mixture which can be mixed efficiently for about 0.5–2.5 hours but separates readily into at least two phases when the stirring is stopped and the mixture allowed to settle. The aqueous phase can be removed for recycling or disposal, and the residual layer to be retained optionally can be washed with water.

The pretreated toxic waste should be pressed or centrifuged to remove as much water as possible prior to proceeding with the next step, i.e., extraction with the nitrogenous base/treatment with solvated electron technology. It is preferred, especially if active metal is to be added to the nitrogenous base, that the toxic waste be dried before proceeding with the extraction and reduction chemistry with solvated electrons, following which the decontaminated carrier material can be recovered.

In the event that improvement in the extraction with nitrogenous base/solvated electron technology of this invention includes post treatment with strong base is to be practiced, it is preferred that solvated electrons be produced in the nitrogenous base/toxic waste mixture by adding active metal in an amount sufficient to produce a solvated electron concentration in excess of that which is required to handle the toxic waste. Then, upon completion of any desired reactions between the toxic waste and the mixture, water can be slowly and carefully added to the reaction mixture, producing strong base in-situ in an amount determined by the amount of the excess active metal that was added.

If the active metal is sodium, the strong base will be sodium hydroxide, the preferred strong base, but it is possible to employ other active metals like lithium and potassium. In amount, the excess active metal to add to the nitrogenous base should be sufficient to generate between about 0.1M and 2M strong base in the reaction mixture when sufficient water is added. After the water is added to the mixture the slurry should continue to be stirred for about 5 min. to about 1 hour, following which the mixture should be allowed to settle. The layers can then be separated and the decontaminated carrier material recovered.

If the toxic waste is to be treated with nitrogenous base alone, absent solvated electrons, then at the completion of the nitrogenous base treatment, an aqueous solution of strong base can simply be added to the reaction mixture in an amount to produce between about 0.1M and 2M strong base in the mixture. After stirring as above and phase separation, the decontaminated toxic waste can be recovered.

The method of this invention will be further clarified by reference to the following specific Examples.

EXAMPLE 1

34.1 gm of wet (50% water) sludge from New Bedford Harbor was placed in a 250 cc beaker equipped with a magnetic stirrer. 50 cc of a 1:1 solution of concentrated nitric acid/water was added to the sludge and mixed well for 30 minutes, filtered through a Buchner funnel and rinsed with water until the filtrate was not acidic. The filter cake was dried in a forced air oven at 225° F. for 2 hours. The following table shows the metals removal efficiency:

TABLE I

| Metal | Starting Material (ppm) | Washed Solids (ppm) |
| --- | --- | --- |
| Cadmium | 12.5 | <1.2* |
| Chromium | 371 | 67 |
| Cobalt | 8.7 | <4.0* |
| Lead | 487 | 26 |
| Manganese | 265 | 163 |
| Thallium | 287 | 51 |
| Vanadium | 44 | 46 |

*= Detection Limit

The solids resulting from acid treatment were charged to a pressure reactor. Liquid ammonia (300 cc) was added. With stirring, sodium metal was added in pieces until a permanent blue color was observed indicating the presence of solvated electrons. A total of 3.0 gm. sodium was needed. The mix was stirred for 15 minutes and the blue color faded. The ammonia was evaporated to leave 35.0 gm of treated dirt. Analysis showed the following destruction efficiency for PCBs.

TABLE II

| Sample | PCB (ppm) |
| --- | --- |
| Starting Material | 9457 |
| SET treated | 599 |

The soil from this initial treatment with solvated electrons is treated a second time using the same quantities of ammonia and sodium. The resultant soil is shown to have a PCB level of 10 ppm.

EXAMPLE 2

Soil from a Texas site comprising 52% sand, 33% silt and 15% clay was found by analysis to contain the following metals in addition to 11,833 ppm PCBs:

TABLE III

| Metal | Concentration (ppm) |
| --- | --- |
| Silver | 209 |
| Arsenic | 182 |
| Barium | 1831 |
| Cadmium | 166 |
| Chromium | 204 |
| Lead | 193 |
| Selenium | 100 |
| Mercury | 87 |

1000 gm of the soil was charged to a 15 liter pressure reactor. The reactor was sealed and 9 liters of ammonia added. The suspension was mixed for 15 minutes at 40 $HZ_3$ on the magnetic drive agitator. Through a lock hopper 61 gm of sodium metal was added to form solvated electrons in-situ. After 5 minutes the conductivity was only 2 milliSiemens. Another 37 gm of sodium was added and the blue color was gone in 2 minutes. A final 31 gm of sodium was added, and the mixture stirred for 15 minutes.

Following the solvated electron reaction in the reactor, the reaction mixture were transferred to a separator using three transfers and stirred briefly to achieve homogenization. Most of the ammonia was then recovered, but a portion (approximately 1 liter) was intentionally left in the separator to generate the ammonia/water extraction media. The ammonia mixture in the separator was quenched with three× 1800 ml portions of water (total 5400 ml) and the ammonia/water mixture stirred for 30 minutes to generate the ammonia/water extract.

The ammonia/water extracts were drained into two four 1 liter beakers five minutes after the stirring was stopped. The extracted cleaned soil remaining in the separator was rinsed with an additional 3600 ml of water, filtered and collected. A second rinse (3600 ml) of the separator was carried out to remove any residual soil. This residual soil was also filtered to give a solid fraction and filtrate.

Table IV below shows the reduced metals content in the ammonia water extract compared to the isolated treated soil Table III above.

TABLE IV

| Metal | Level in Clean Soil (ppm) | Removal (%) |
|---|---|---|
| Silver | 31 | 85 |
| Arsenic | <12.5 | 93 |
| Barium | 286 | 84 |
| Cadmium | 15 | 91 |
| Chromium | 39 | 81 |
| Lead | 30 | 84 |
| Selenium | <12.5 | 88 |
| Mercury | 3 | 97 |

The PCB level in the recovered soil was reduced to only 4 ppm.

EXAMPLE 3

A toxic waste material consisting of corncobs is contaminated with 353 ppb dioxin and mineral oil. The contaminated corn cobs are shredded to provide 200 gm sample of the toxic waste material. The gross sample containing the dioxin is introduced into a mechanically stirred 2 liter beaker cooled to −78° C. with dry ice/acetone. Anhydrous liquid ammonia (800 ml) is then added to the beaker, followed by finely divided sodium metal (20 g) added portion-wise. The blue color characteristic of solvated electrons is observed as the sodium is added. One hour after the sodium has all been added, water (150 ml) is slowly added to the reaction mixture with stirring as the temperature is allowed to rise spontaneously and ammonia is evaporated. When the temperature of the reaction mixture reaches room temperature the stirring is discontinued and the contents of the beaker allowed to settle.

After a time, the contents of the beaker have separated into two phases, an upper phase containing the cellulosic particles and a lower, somewhat cloudy aqueous ammonia phase. The cellulosic phase is recovered by pouring the reaction mixture through a large fluted filter at atmospheric pressure. After filtration, the solid collected on the filter is washed twice with water. The cellulosic material is then transferred to a petri dish and dried at room temperature for 48 hours in a vacuum oven. The resultant cellulosic material is coated with an oily material. A gross sample of the product contains less than 1 ppb dioxin.

EXAMPLE 4

In order to demonstrate more efficient use of solvated electrons in decontaminating toxic waste by minimizing competing side-reactions the following experiment was conducted:

A two liter pressure vessel was equipped with a magnetic drive agitator having a bottom propeller blade. Inlets were provided through a "hopper" consisting of a 1 inch pipe having ball valves on each end. Another inlet was provided for addition of liquids. An outlet was connected to an ammonia condenser system.

Procedure (a):

The reactor was thoroughly cleaned before use with a water rinse and then dried. A weighed amount of soil was introduced and the reactor sealed. Anhydrous liquid ammonia was transferred to the reactor by opening the valve between the ammonia storage tank and the reactor, using venting of the ammonia vapor in the reactor as necessary. With the exception of soil sample No. 1, all soils were initially mixed with ammonia at 200 rpm at 0° C. (extraction) before introducing the active metal (sodium) into the reactor. Instead of separating the liquid ammonia from the soil particulates, either solid sodium metal was added to the mixture through the hopper or a solution of solvated electrons transferred from a second pressure vessel. Sodium metal was used at a level of 4 percent by weight based on total weight of soil. Pressure, temperature and conductivity were recorded for each reaction. Once the solvated electrons were depleted as indicated by a loss of conductivity, the mix was stirred for 30 minutes. Ammonia was evaporated and the soil product recovered and analyzed for PCBs.

Procedure (b):

This procedure was the same as Procedure (a) above, except the PCB contaminated soil-ammonia mixture was extracted by stirring for a specified time period at an elevated temperature of at least 20° C., but usually at 40° C., followed by a reduction in temperature to 0° C. before addition of the sodium metal or solution of solvated electrons.

The soil samples tested had the following characteristics:

| SOIL CHARACTERIZATION (PCB CONTAMINATED) | | | | | |
|---|---|---|---|---|---|
| SOIL | SAND (%) | SILT (%) | CLAY (%) | IRON (%) | CEC* |
| 1 | 88 | 2 | 11 | 3.6 | 4.2 |
| 2 | 52 | 11 | 37 | 6.8 | 31.4 |
| 3 | 43 | 23 | 34 | 10.1 | 29.3 |
| 4 | 41 | 20 | 39 | 8.5 | 32.8 |

* = Cation exchange capacity (Meq/100 gm)

Soil samples #1–4, each containing various levels of PCBs indicated below, were dried and first extracted with anhydrous liquid ammonia with the exception of soil #1, procedure (a), and then treated with solvated electrons without prior separation from the soil using the above identified procedures.

TABLE V

| Soil | Procedure | Extraction Time (Min.) | Extraction Temp. (° C.) | Reaction Temp. (° C.) | PCB Level (ppm) START | PCB Level (ppm) FINAL | Destruction (%) |
|---|---|---|---|---|---|---|---|
| 1 | a | 0 | — | 20 | 450 | 8.7 | 98.1 |
| 1 | b | 15 | 20 | 20 | 450 | 3.5 | 99.2 |
| 2 | a | 15 | 0 | 0 | 317 | 35.0 | 88.9 |
| 2 | b | 30 | 40 | 0 | 317 | 25.0 | 92.1 |
| 3 | a | 15 | 0 | 0 | 214 | 4.0 | 98.1 |
| 3 | b | 30 | 40 | 0 | 214 | 0.6 | 99.7 |
| 4 | a | 15 | 0 | 0 | 2320 | 91.0 | 96.0 |
| 4 | b | 30 | 40 | 0 | 2320 | 31.0 | 98.7 |

Table V demonstrates the beneficial effects of extracting the toxic waste with nitrogenous base before the introduction of solvated electrons for the destruction of the toxin. When the initial extraction process was performed at elevated temperatures, i.e., 40° C., followed by a lowered temperature for reaction with solvated electrons the final level of the toxin in the soil was further reduced.

The test results with soil samples 2–4 are especially significant because the samples possess high concentrations of iron and clay, and consequently also have high cation exchange capacities, as shown in the soil characterization table above. These inventors found this creates a reaction media which enhances the occurrence of unwanted competing side reactions for solvated electrons, raising sodium demand, lowering selectivity for the toxin and providing lower destruction percentages. Notwithstanding, soil samples 2, 3 and 4 processed according to procedure (b), wherein the toxin is first extracted at elevated temperature, followed by lowering the temperature to 0° C. before initiating the reaction with solvated electrons, had higher destruction percentages of the PCB toxin. This was accomplished without prior separation of the ammoniacal solution comprising the extracted toxin from the soil carrier responsible for the competing reactions. Such improved results were achieved without increasing sodium loading in the reaction mixtures.

It should be noted, the favorable destruction percentages achieved with Soil sample 1, using both procedure (a) but without prior extraction of toxin, and procedure (b), but without temperature differential between extraction and reaction, are attributed to the very high sand content (88%), and correspondingly low iron, clay and cation exchange capacity of this soil. Such highly sandy soils do not present the same competing side reactions normally associated with soils comprising more balanced compositions inclusive of organic material, clay, iron, silt, etc., and which have higher cation exchange capacities, like those of soil samples 2–4.

EXAMPLE 5

To demonstrate the additional sodium consumption required when solvated electrons treatment does not involve a preliminary extraction step at elevated temperatures, soil #4 from Example 4 was tested at different levels of sodium demand.

TABLE VI

| Soil | Procedure | Extraction Time (Min.) | Extraction Temp. (° C.) | Reaction Temp. (° C.) | Sodium % by wt Soil | PCB Level (ppm) START | PCB Level (ppm) FINAL | Destruction (%) |
|---|---|---|---|---|---|---|---|---|
| 4 | a | 15 | 0 | 0 | 10 | 2300 | 91 | 96 |
| 4 | b | 30 | 40 | 0 | 6 | 2300 | 54 | 97.7 |
| 4 | a | 15 | 0 | 0 | 20 | 2300 | 39 | 98.3 |
| 4 | b | 30 | 40 | 0 | 12 | 2300 | 31 | 98.7 |

Table VI demonstrates that with prior extraction of the toxic waste at elevated temperatures high levels of PCB destruction can still be achieved using solvated electrons prepared with reduced levels of sodium metal. That is, pre-extraction at elevated temperatures followed by reduced temperatures before initiating reduction of the toxin permitted more efficient use of sodium metal in the formation of solvated electrons because of fewer competing side reactions. Without extraction at elevated temperatures 20% sodium gives slightly poorer PCB removal than the use of 12% sodium with pre-extraction performed at elevated temperatures. This represents a 67% increase in sodium usage.

EXAMPLE 6

In order to demonstrate more efficient use of solvated electrons in the decontamination of solid waste according to a further embodiment of this invention the following experiment was conducted:

For purification of PCB contaminated soil a pressure reactor was modified by placing a 100 mesh stainless steel screen over the opening at the bottom discharge end using adhesive to hold it in place. A flexible hose was connected to the discharge ball valve of the reactor and then connected to a receiver through another ball valve. Nitrogen pressure was applied to the reactor via flexible hosing from a high pressure cylinder to aid in discharging ammonia after extracting the PCBS from the soil.

In performing these studies the reactor was charged with the soil and sealed. Ammonia was used at ambient temperature or heated to a temperature of 30 to 40° C. in a feed vessel and the desired volume charged to the reactor. Pressure was in the range of 100–200 psig. Extraction of the soil was performed by agitating a mixture of the soil and liquid ammonia at 200 rpm for 30 minutes. Agitation was terminated and the reactor pressurized with nitrogen to exceed the reactor pressure by 20 to 30 psig. The bottom valve was opened slowly and ammonia drained into the receiver. Soil was discharged and analyzed for PCBs.

In order to chemically destroy the PCBs with solvated electrons, the PCB-containing ammonia in the receiver was transferred back to the reactor through the ball valve assembly. Using the hopper assembly for solids addition, sodium metal was added in portions until a conductivity of 200 millisiemens/cm was obtained for 5 minutes. The ammonia was evaporated, the reactor contents taken up in a weighed amount of hexane and analyzed for residual PCBs.

The naturally weathered soil used in the studies of this Example had the following characteristics:

SOIL CHARACTERIZATION (PCB CONTAMINATED)

| SOIL | SAND (%) | SILT (%) | CLAY (%) | IRON (%) | CEC* meq/100 g |
|---|---|---|---|---|---|
| 1 | 31 | 47 | 22 | 2.79 | 17.2 |
| 2 | 88 | 1 | 11 | 2.80 | 4.4 |
| 3 | 57 | 25 | 18 | 5.50 | 21.1 |
| 4 | 52 | 11 | 37 | 6.80 | 31.4 |
| 5 | 41 | 20 | 39 | 8.50 | 32.8 |
| 6 | 54 | 27 | 19 | 0.95 | 12.2 |

* = cation exchange capacity

Using the above disclosed procedure, naturally weathered soils 1–6 characterized above and containing PCBs were dried and extracted with ammonia. Table VII provides the results.

TABLE VII
(EXTRACTION)

| Soil | Extraction Temperature ° C. | Pressure psig | Loading gm/liter* | Cycle** | PCB Level (ppm) Start | PCB Level (ppm) Final | Extraction % |
|---|---|---|---|---|---|---|---|
| 1a | 40 | 200 | 54 | 1 | 9450 | 1423 | 84.9 |
| 1b | 40 | 200 | 54 | 2 | 1423 | 202 | 97.8 |
| 1c | 40 | 200 | 54 | 3 | 202 | <0.2 | 99.9 |
| 2 | 20 | 110 | 150 | 1 | 850 | 24 | 97.2 |
| 2 | 40 | 200 | 150 | 1 | 850 | 9 | 98.9 |
| 3a | 40 | 200 | 162 | 1 | 6088 | 558 | 90.8 |
| 3b | 40 | 200 | 132 | 2 | 558 | 130 | 97.9 |
| 4a | 40 | 200 | 156 | 1 | 239 | 13 | 94.6 |
| 4b | 40 | 200 | 135 | 2 | 13 | 3.5 | 98.5 |
| 5a | 40 | 200 | 150 | 1 | 1783 | 59 | 96.7 |
| 5b | 40 | 200 | 135 | 2 | 59 | 10 | 99.4 |
| 6 | 20 | 105 | 58 | 1 | 77 | 3.5 | 95.5 |

* = grams soil/L liquid ammonia
** = extractions with liquid ammonia

Table VII demonstrates single and multiple extractions of PCB toxin from soil at elevated temperatures according to the invention. Soil samples containing high loadings of PCBs, such as Soil #1 were extracted in 3 cycles (1a, 1b, 1c) to remove virtually all toxin from the original sample. Similar results were also achieved in test samples 3a–3b; 4a–4b and 5a–5b.

In this experiment, extractant comprising liquid ammonia and PCB toxin extracted as disclosed in Table VII was subsequently reduced with solvated electrons by introducing sodium metal into the washings placed in a separate closed pressure vessel to form ammoniated electrons in-situ. The one reaction shown shown in Table VIII below is representative of the reaction:

TABLE VIII

| Soil Extracted (gms) | PCBs Extracted (gms) | Sodium Used (gms) | PCB Destruction (%) |
|---|---|---|---|
| 301.3 | 0.130 | 5.9 | 99.95 |

EXAMPLE 7

To demonstrate the effect of particle size on the performance of solvated electrons in the decontamination of toxic waste, solid substrates were treated "as received" and after grinding. The method of Example 4 was used in decontaminating the substrates. Depending on the substrate, three grinding methods were employed: mortar and pestle, laboratory grinding mill (Wiley Mill from Fisher Scientific, Catalogue No. 08-338), and a Black & Decker® food chopper.

The effects of grinding various substrates are illustrated in Table IX below:

TABLE IX

| Substrate | Grinding Procedure | Mesh | PCB Level (ppm) Starting | PCB Level (ppm) Final | Destruction (%) |
|---|---|---|---|---|---|
| Corncobs | None | n/a | 1600 | 147 | 90.8 |
| Corncobs | Wiley Mill | −20 | 2113 | 6.7 | 99.7 |
| Capacitor Foil | None | n/a | 295,000 | 170,000 | 42.3 |
| Capacitor Foil | Food Chopper | shredded | 280,000 | 935 | 99.4 |
| Capacitor Resin | None | n/a | 5,895 | 3725 | 36.8 |
| Capacitor Resin | Food Chopper | −20 | 5,895 | 548 | 84.3 |
| Soil rock | None | n/a | 1,208 | 882 | 18.2 |

TABLE IX-continued

| Substrate | Grinding Procedure | Mesh | PCB Level (ppm) Starting | PCB Level (ppm) Final | Destruction (%) |
|---|---|---|---|---|---|
| Soil rock | Wiley Mill | −20 | 4,977 | 23 | 98.4 |
| Sandy soil | None | n/a | 239 | 14 | 94.1 |
| Sandy soil | Wiley Mill | −20 | 314 | 3.5 | 98.9 |
| Silty soil | None | n/a | 9435 | 669 | 92.2 |
| Silty soil | Wiley Mill | −40 | 9435 | 105 | 98.8 |

Table IX demonstrates the effectiveness of pretreatment of the substrate by grinding/milling of various forms of solid waste before extracting at an elevated temperature followed by reacting with solvated electrons at reduced temperature.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives, modifications and variations as to fall within the spirit and scope of the appended claims.

We claim:

1. A method for decontaminating a toxic waste comprising the steps of:
   (i) introducing a nitrogenous base and a toxic waste into a vessel, said toxic waste comprising a solid carrier material contaminated with a toxin;
   (ii) extracting the toxin from said solid carrier material by agitating the nitrogenous base and toxic waste at an elevated temperature ranging from about 10° to about 60° C. to form an extracted mixture;
   (iii) reducing the temperature of said extracted mixture sufficiently below the elevated temperature operated at in step (ii) to minimize the occurrence of competing side reactions during destruction of the toxin;
   (iv) creating a reaction mixture by introducing into the extracted mixture of step (iii) an active metal suitable for dissolving in said nitrogenous base, and
   (v) reacting said reaction mixture.

2. The method of claim 1 wherein the reaction mixture comprises solvated electrons.

3. The method of claim 2 wherein the nitrogenous base is liquid ammonia, and the active metal is a member selected from the group consisting of sodium, potassium, lithium, calcium and mixtures thereof.

4. The method of claim 3 wherein the solid carrier is a material performing as an adsorbent or absorbent for the toxin.

5. The method of claim 3 wherein the solid carrier is a member selected from the group consisting of soil, sand, gravel, clay, stone, concrete, asphalt, brick, block, masonry, carbon, polymer, zeolites, plastic, elastomeric material, metal, glass, glass fiber, textile, cellulosic material, and combinations thereof.

6. The method of claim 3 wherein the solid carrier comprises a cellulosic material selected from the group consisting of wood chips, sawdust, paper, paper board, shredded corn cobs, ground corn cobs, cotton and mixtures thereof.

7. The method of claim 3 wherein the temperature of the mixture in step (iii) is reduced to about 10° to about −20° C.

8. The method of claim 3 wherein the temperature of the mixture in step (iii) is reduced from about 10° to about 70° below the extraction temperature of step (ii).

9. The method of claim 3 including the preliminary step of reducing the particle size of the toxic waste.

10. The method of claim 3 including the preliminary step of removing water from the toxic waste.

11. The method of claim 3 wherein the toxin is a material selected from the group consisting of an energetic material, radionuclide, nuclear waste, heavy metal, halogenated organic, polynuclear aromatic hydrocarbon, volatile organic compound, sludge and mixtures thereof.

12. The method of claim 3 wherein the toxin comprises a member selected from the group consisting of PCBs, pesticide, dioxin and mixtures thereof.

13. The method of claim 3 including the step of pretreatment of the toxic waste with an acid.

14. The method of claim 3 including the step of post treatment of the reaction mixture of step (v) with a strong base.

15. A method for decontaminating a toxic waste comprising the steps of:
   (i) introducing a nitrogenous base and a toxic waste into a vessel to form a mixture, said toxic waste comprising a solid carrier material contaminated with a toxin;
   (ii) washing said mixture by agitating the nitrogenous base and toxic waste at an elevated temperature ranging from about 10° to about 60° C. to remove the toxin from said solid carrier material and to form a nitrogenous extract comprising said toxin;
   (iii) separating said nitrogenous extract from said solid carrier material;
   (iv) repeating the washing and separating steps (ii and iii) a sufficient number of times to reduce the level of toxin in said solid carrier material to about <10 ppm by introducing nitrogenous base into said solid carrier material of step (iii) to form further nitrogenous extract(s);
   (v) creating a reaction mixture by introducing into the nitrogenous extract(s) of steps (iii and iv) an active metal suitable for dissolving in said nitrogenous base and
   (vi) reacting said reaction mixture.

16. The method of claim 15 wherein the reaction mixture of step (v) comprises solvated electrons.

17. The method of claim 16 wherein the nitrogenous base is liquid ammonia, and the active metal is a member selected from the group consisting of sodium, potassium, lithium, calcium and mixtures thereof.

18. The method of claim 17 wherein the solid carrier is a material performing as an adsorbent or absorbent for the toxin.

19. The method of claim 17 wherein the solid carrier is a member selected from the group consisting of soil, sand, gravel, clay, stone, concrete, asphalt, brick, block, masonry, carbon, polymer, zeolites, plastic, metal, glass, glass fiber, textile, cellulosic material, and combinations thereof.

20. The method of claim 17 wherein the solid carrier comprises a cellulosic material selected from the group consisting of wood chips, sawdust, paper, paper board, shredded corn cobs, ground corn cobs, cotton and mixtures thereof.

21. The method of claim 17 wherein the temperature of the reaction mixture for step (v) ranges from about −33° to about 50° C.

22. The method of claim 17 including the preliminary step of reducing the particle size of the toxic waste.

23. The method of claim 17 including the preliminary step of removing water from the toxic waste.

24. The method of claim 17 wherein the toxin is a material selected from the group consisting of an energetic material, radionuclide, nuclear waste, heavy metal, halogenated organic, polynuclear aromatic hydrocarbon, volatile organic compound, sludge and mixtures thereof.

25. The method of claim 17 wherein the toxin is a member selected from the group consisting of a PCB, pesticide, dioxin and mixtures thereof.

26. The method of claim 17 including the step of pre-treatment of the toxic waste with an acid.

27. The method of claim 17 including the step of post treatment of the reaction mixture of step (vi) with a strong base.

* * * * *